INVENTOR.
Henry J. Woestemeyer

April 7, 1959     H. J. WOESTEMEYER     2,880,627
AUTOMATIC TRANSMISSION

Filed March 5, 1956     3 Sheets-Sheet 3

INVENTOR.
Henry J. Woestemeyer
BY

ATTORNEYS

United States Patent Office 2,880,627
Patented Apr. 7, 1959

2,880,627

AUTOMATIC TRANSMISSION

Henry J. Woestemeyer, Monticello, Utah

Application March 5, 1956, Serial No. 569,543

8 Claims. (Cl. 74—688)

This invention relates to automatic transmissions for connection to the output shaft of a power unit, and more particularly to an automatic transmission of stepless speed change ratios and/or torque output change for internal combustion engines.

Automatic transmissions have been known and used for some time for providing a speed change ratio from the driving power unit to the driven unit in an attempt to obtain maximum efficiency of the mechanism. The usual type of automatic transmission, however, is very complex and of expensive manufacture and repair. These known automatic transmissions make use of a very complicated hydraulic oil distribution system, complicated valve construction, servo units, brake bands, clutches or the like. While all automatic transmissions use some sort of fluid coupling, most use a change speed gear set, so that the speed change is stepwise from gear to gear.

According to the present invention, I have provided an improved transmission which provides an automatic stepless variable speed from an output shaft speed of zero to maximum speed thereof. The transmission, in general, includes a compound planetary gear train having a controllable escapement of speed of one member of the train. The compound planetary train has a primary planetary gear set or epicyclic train and a secondary planetary gear set or epicyclic train in which the planet arms are common to both sets of planet gears and the external ring gear is, likewise, common to both sets of gears. There is provided a slight difference of gear ratios between the two sets so that the secondary sun gear rotates at a slightly higher speed than the primary sun gear when the speed of the transmission output shaft is less than that of the motor. The primary sun gear is interconnected with the output shaft from a power source or a power input shaft, and the secondary sun is interconnected with an escapement control so that there is a control on the speed of the rotation of the planet arms which are directly connected to the transmission output shaft. In one preferred form, the speed escapement control is a fluid coupling interconnected with the power input shaft and the secondary sun gear.

Included among the objects and advantages of the present invention is the provision of a simplified automatic transmission for use with internal combustion engines, which transmission takes advantage of the accelerating factor of such an engine to effect a stepless variation of torque multiplication and/or speed change ratio with a minimum power loss. The transmission provides a simplified construction of a substantially reduced number of component parts. The invention provides a transmission in which the power through a planetary gear train activates a torque multiplication mechanism and is returned to the power source with a minimum of power loss. A hydraulic coupling permits a torque escape which cushions the action of two planetary gear sets in the transmission. The transmission includes two integral planetary gear sets having two common components and a different gear ratio between the two sets for operating the driver and driven components of the fluid coupling at different speeds. The invention provides, furthermore, an automatic stepless variation of speed of the output shaft, which variation will have only one value at a particular speed of input shaft and at a particular torque of input power. The invention, further, provides a transmission in which the torque output of the transmission is at all times inversely proportional to the speed output of the transmission.

These and other objects and advantages of the invention may be readily ascertained by referring to the following description and appended illustrations in which.

Figure 1:
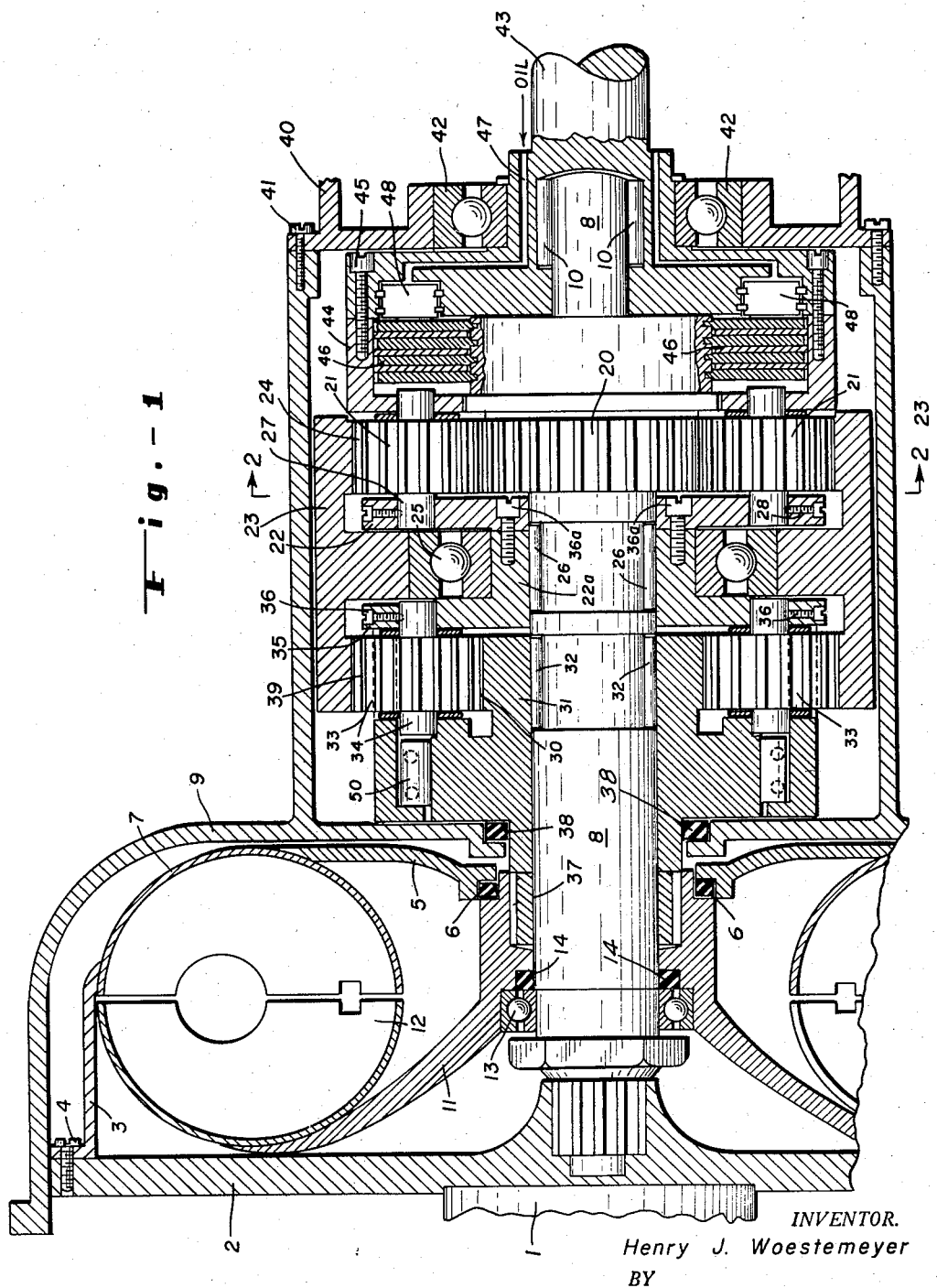
Fig. 1 is a partial cross-sectional view of a transmission according to the invention interconnected with a fluid coupling and an output shaft.

In the device illustrated in Fig. 1, an engine crank or driveshaft 1 is mounted for rotation on a driving engine, not shown. The transmission is mounted in a transmission box 9, which is mounted on the engine block (not shown). The shaft 1 is interconnected with a fly wheel 2 and is arranged to rotate with the operation of the engine. A torus shell 3 is secured, as by means of bolts 4, to the flywheel 2 and the lower portion or torus hub 5 is mounted on an oil seal 6, and the structure is arranged to rotate with the flywheel 2. A plurality of vanes 7, forming a runner or driven member, are mounted in annular arrangement around the torus shell. An intermediate drive shaft 8 is interconnected with the flywheel 2 at one end and is journaled in roller bearings 10 which are mounted in an output shaft 43 so as to provide free rotation therebetween. The output shaft 43 is journaled in the transmission box 9 by ball bearing set 42 at the opposite end thereof for free rotation. A drum 11 carries a plurality of vanes 12 which form the impeller or driving member of the fluid coupling. The member 7 runs at a slower speed than the drum member 11 by means of a gear arrangement, as detailed below, and is, therefore, the driven member even though directly connected to the motor. The drum 11 is journaled for rotation on the shaft 8, and a plurality of ball bearings 13 provide free movement of the drum around the shaft. An oil seal 14 seals the drum to the shaft.

Figure 2:
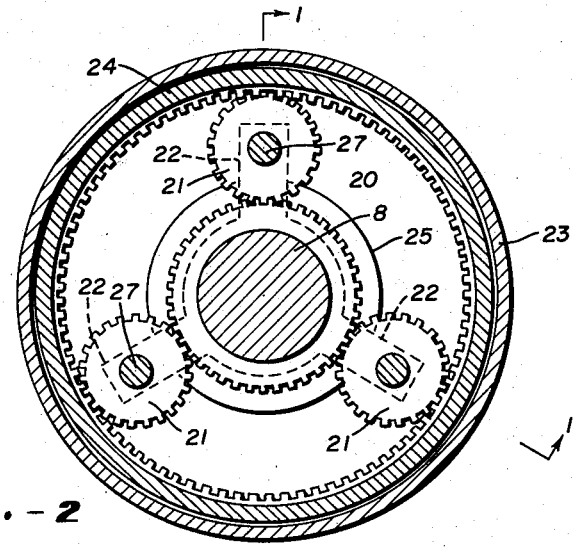
Fig. 2 is a cross-sectional elevation of the device of Fig. 1 taken along section line 2—2.

A primary sun gear 20 is secured to or is integrally formed on the intermediate shaft 8 and rotates therewith. In a preferred form, three planet gears 21 are mounted on planet arms 22 and are arranged to revolve about the sun gear 20, illustrated in Fig. 2. An external ring gear 23 has teeth 24 for meshing with the teeth of the planet gears which are arranged to rotate internally of the ring gear 23. The planet arms 22 are mounted on a hub 22a which freely rotates around shaft 8 on roller bearings 26. Each planet arm 22 is secured to a shaft 27 for each planet gear, and the shaft is held by means of a set screw 28 so that the shaft will not rotate in the planet gear. A secondary sun gear 30 is mounted on a drum 31 which is journaled on and freely rotates around the shaft 8 on roller bearings 32. Three secondary planet gears 33 are mounted on secondary planet gear shafts 34, in a similar manner to the structure of the primary set shown in Fig. 2, which are interconnected with planet arms 35. The secondary planet arms 35 are secured to the shafts 34 by means of a set screw 36 so that the planet arm rotates with the shaft of the planet. The secondary arms 35 are interconnected or integrally formed with the hub 22a so to be interconnected with arms 22, and rotate about the shaft 8 therewith. The secondary planet arms 35 are secured by means of set screws 36 to the shafts 34 and will not rotate with the planets. The secondary planet gears rotate together with the primary planet gears on arms. The opposite end of the drum 31 is splined at 37 to the drum 11 so that the two parts rotate conjointly about the intermediate shaft 8. An oil seal 38 is provided between the drum 31 and the transmission housing 9 to prevent the flow of oil back through the transmission. The secondary planets are mounted for rotation in the teeth 39 of the ring gear 23 so that the ring gear 23 is common to both the primary planet set and the secondary planet set. The gear ratio between the two planet sets is slightly different so that the secondary sun 30 rotates at a slightly higher r.p.m. than the primary sun 20, when there is a difference of speed between the source of power and the transmission output shaft. This produces a slightly increased rate of speed for the driver vanes 12 over the runner vanes 7.

The end of the housing 9 opposite the engine block is closed by means of a secondary housing 40 secured thereto by cap screws 41, and the ball bearing set 42 permits rotation of an output shaft 43. The output shaft 43 is connected to the planet shafts 27 through a drum member 44 and secured thereto by means of cap screws 45. The housing 40 may contain such accessories as an oil pump, reversing gearing, brake gearings and any other suitable type mechanism which may be required for the particular operation. An automatic friction clutch 46 provides an automatic connection between the shafts of the primary planet and the output shaft 43, so that a direct connection between the intermediate shaft 8 and the output shaft 43 may be provided by the operator. The automatic friction clutch is a commonly known expedient in automatic transmissions, where the clutch is engaged by the output of an oil pump on rotation of the engine. A passageway 47 provides an oil conduit for operating a cylinder 48 which controls the operation of the friction clutch 46 and provides a direct connection between the intermediate and output shafts. Oil for the clutch is provided by an oil pump, not shown, which is housed in the rear housing, only a portion of which, 40, is illustrated.

One way clutch 50, which is an automatic grab clutch, is provided, when the transmission is used with a vehicle, to prevent the output shaft, which is connected to the planet arms, from rotating the ring at increased speed, reducing the speed of the motor and reducing the braking effect of the motor when the vehicle is going down a hill or the like. Such one way clutches are well known in the art and any suitable type is useful for preventing the secondary sun from running slower than the planet arm 22a.

The output of the motor is connected to the intermediate drive shaft 8 and to the runner vanes 7 of the fluid coupling. The planet sets produce a slightly higher speed of the impeller vanes 12, and the difference in the speed is provided with an escapement in the form of the ring gear 23. As there is always a slip in the fluid coupling in order that it may transmit torque, there will always be a reduction of speed through the transmission when power or torque is impressed on the output shaft. The output shaft 43 is interconnected to the planet gear shafts of the primary set and operates therewith except when directly coupled with the intermediate shaft. The primary and secondary epicyclic or planetary gear trains have a common ring gear 23, but the sun gear of each of the sets operates at a slightly different speed. The torque from the motor, delivered to the primary ring gear through the primary planet set, is delivered by its common mate, the secondary ring gear, to the secondary planet set, and since the secondary sun gear is interconnected with the impeller of the hydraulic coupling, the torque is transmitted back to the source or to the vanes of the runner. There is a slight loss of power going through the gears. The return power to the runner provides a retarding force on the common ring gear which creates a secondary source of power on the primary set causing an infinite variation of torque and/or speed on the output shaft depending on the amount of slip which is induced in the hydraulic coupling. As all of the force which is delivered to the secondary planet set is directed back to the source, the only loss which occurs is that which is inherent in the gear set and the coupling itself. A characteristic of a fluid coupling is that there will be only one percentage of slippage at any stated speed of impeller at a particular torque. Any difference in gear ratios between the primary and secondary gear sets can be chosen which will allow the output shaft of transmission to come to zero speed within the slip limitations of the fluid coupling at engine idling speed. The transmission will, therefore, have only one speed for a particular speed of engine and a particular amount of torque imposed on the impeller of the coupling. The output speed will change, however, to some new value for any change in either the speed of the impeller or the amount of torque which is imposed on the impeller.

In Table I, given below, the speed ratio and output of an engine at one third of maximum torque is illustrated at various engine input speeds.

*Table I*

[One third maximum torque (one third throttle opening)]

| Engine Speed, r.p.m. | Percent Slip | Percent of Full Motor Speed | Speed of Vehicle | Speed Reduction |
|---|---|---|---|---|
| Idle | | | 0.0 | Infinite |
| 810 | 8.52 | 22½ | 0.17 | 120/1 |
| 845 | 8.0 | 23½ | 1.35 | 16/1 |
| 883 | 7.22 | 24½ | 3.7 | 6/1 |
| 950 | 6.58 | 26½ | 4.95 | 4.8/1 |
| 975 | 6.5 | 27 | 6.1 | 4/1 |
| 1,025 | 5.55 | 28½ | 8.55 | 3/1 |
| 1,045 | 5.0 | 29 | 10.9 | 2.4/1 |
| 1,150 | 4.4 | 32 | 14.4 | 2/1 |
| 1,440 | 2.62 | 40 | 22.5 | 1.6/1 |
| 1,530 | 2.37 | 42.5 | 28.7 | 1.33/1 |

The fluid coupling of the device of Table I has a slip factor of 2.62% at 3200 r.p.m. at maximum throttle, and the miles per hour is based on a vehicle having a rear axle ratio of 3.27 to 1 and a tire size of 6.70 x 15, and full speed of the motor is 3600 r.p.m. These same figures apply to Table II, which is the same vehicle at full throttle opening.

*Table II*

[Maximum torque (full throttle opening)]

| Engine Speed, r.p.m. | Percent Slip | Percent of Full Motor Speed | Speed of Vehicle | Speed Reduction |
|---|---|---|---|---|
| Idle | | | 0.0 | Infinite |
| 1,440 | 8.52 | 40 | 0.3 | 120/1 |
| 1,500 | 8.0 | 42 | 2.35 | 16/1 |
| 1,590 | 7.22 | 44 | 6.6 | 6/1 |
| 1,750 | 6.58 | 48½ | 9.15 | 4.8/1 |
| 1,835 | 6.5 | 51 | 11.5 | 4/1 |
| 1,910 | 5.55 | 53 | 15.9 | 3/1 |
| 1,980 | 5.0 | 55 | 23.0 | 2.4/1 |
| 2,080 | 4.4 | 57 | 25.75 | 2/1 |
| 3,060 | 2.62 | 85 | 47.5 | 1.6/1 |
| 3,600 | 2.37 | 100 | 67.5 | 1.33/1 |

At idling speeds, the ring gear is rotating in a reverse or negative direction to the rotation of the primary sun gear, and the planet arms are at zero revolutions. As the power of the input, motor speed, is increased, the ratio of overspeed of the impeller to that of the runner is decreased and the ring gear rotates at a lower speed so that the planet arms commence rotating. As the motor speed increases, the ring gear further reduces until the point is reached where it is not revolving and the planet arms are revolving to turn the output shaft. As the motor speed increases the ring gear commences rotation in a positive direction with the primary sun gear and the planet arms are revolving at increased speed. Also, at idling speed the secondary sun gear is rotating at about 8.42% greater speed than the primary sun, as is the impeller in relation to its runner of the fluid coupling.

According to the tables, the slip in the coupling is directly proportionate to the speed ratio between the motor and the output shaft. As the percentage of slip to motor speed is a fixed value, at a particular torque from the motor there is only one motor speed which will produce that fixed value. In the following tables all the factors of the other two tables are the same, except a coupling which has a 2% slip at 3200 r.p.m. is used instead of the 2.62% slip of the fluid coupling of Tables I and II.

*Table III*

[One third maximum torque (one third throttle opening)]

| Engine Speed, r.p.m. | Percent Slip | Percent of Full Motor Speed | Speed of Vehicle | Speed Reduction |
| --- | --- | --- | --- | --- |
| 610 | 8.42 | 17 | .13 | 120/1 |
| 650 | 8.0 | 18 | 1.0 | 16/1 |
| 685 | 7.22 | 19 | 2.85 | 6/1 |
| 720 | 6.85 | 20 | 3.75 | 4.8/1 |
| 735 | 6.5 | 20.5 | 4.6 | 4/1 |
| 755 | 5.55 | 21 | 6.3 | 3/1 |
| 790 | 5.0 | 22 | 8.2 | 2.4/1 |
| 890 | 4.4 | 24.5 | 11.0 | 2/1 |
| 1,170 | 2.62 | 32.5 | 18.3 | 1.6/1 |
| 1,200 | 2.37 | 33.5 | 22.5 | 1.33/1 |

*Table IV*

[Maximum torque (full throttle opening)]

| Engine Speed, r.p.m. | Percent Slip | Percent of Full Motor Speed | Speed of Vehicle | Speed Reduction |
| --- | --- | --- | --- | --- |
| 1,150 | 8.42 | 32.0 | .23 | 120/1 |
| 1,190 | 8.0 | 33.0 | 1.85 | 16/1 |
| 1,220 | 7.22 | 33.75 | 5.0 | 6/1 |
| 1,260 | 6.85 | 35.0 | 6.5 | 4.8/1 |
| 1,300 | 6.5 | 36.0 | 8.1 | 4/1 |
| 1,320 | 5.55 | 36.5 | 11.0 | 3/1 |
| 1,350 | 5.0 | 37.5 | 14.0 | 2.4/1 |
| 1,530 | 4.4 | 42.4 | 19.2 | 2/1 |
| 1,980 | 2.62 | 55 | 31.0 | 1.6/1 |
| 2,070 | 2.37 | 57.5 | 38.5 | 1.33/1 |

In Tables III and IV using a coupling of low slip, the versatility of the transmission is demonstrated. By a simple change of the fluid coupling the speed reduction characteristics are changed. Also, a change in the gear ratio between the primary and secondary planet sets produces a change in the speed reduction characteristics of the transmission.

Figure 3:
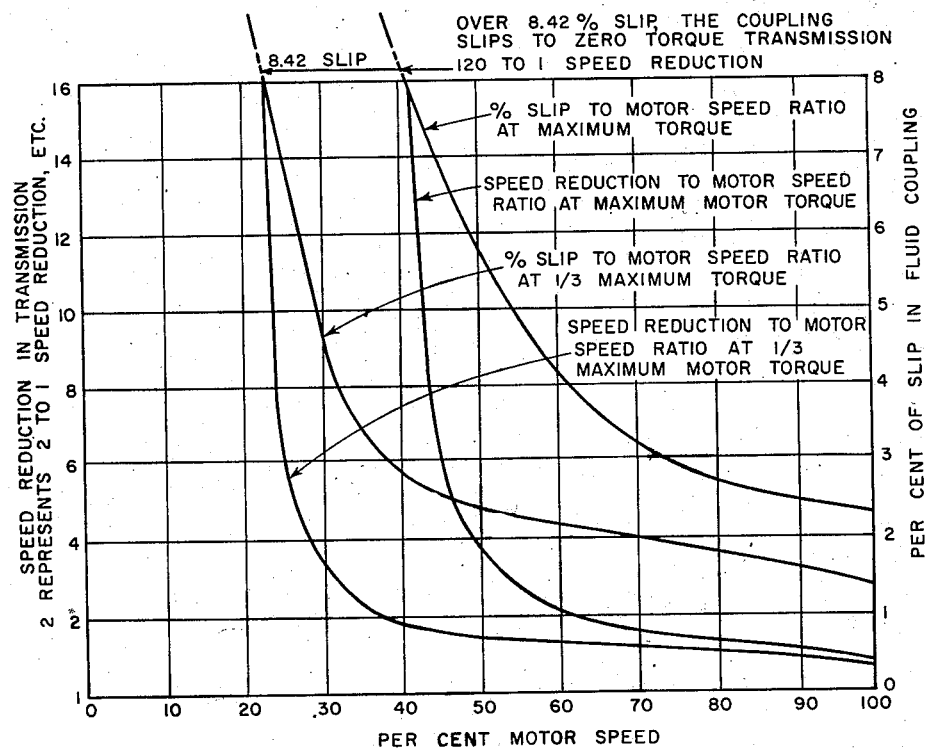
Fig. 3 is a chart showing torque multiplication and speed variation related to motor speed and slip in a fluid coupling at one third of maximum torque and at maximum torque.
Figure 4:
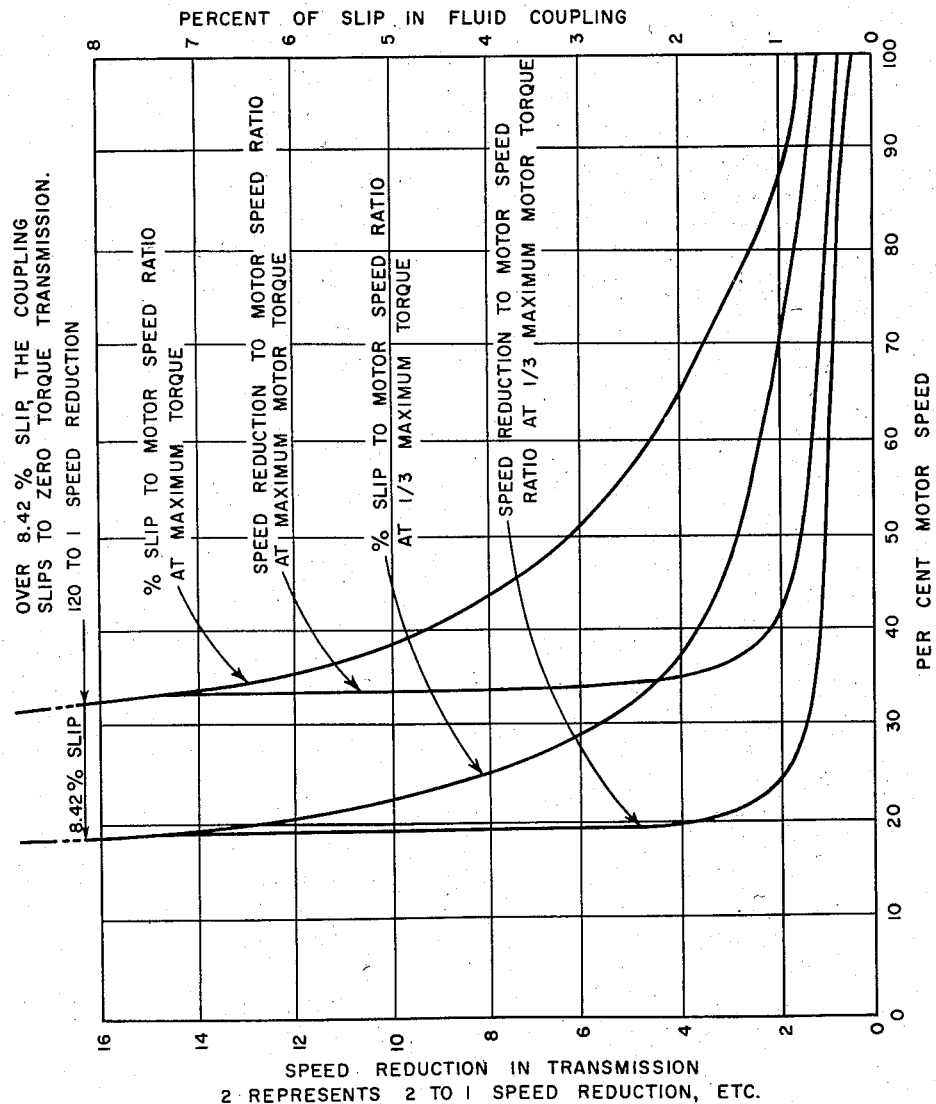
Fig. 4 is a chart similar to that of Fig. 3 using a fluid coupling with different slip characteristics.

The graphs of Figs. 3 and 4 show the speed and torque relations of the transmission and motor. These graphs show the stepless variation of speed and/or torque multiplication which are characteristic of the transmission. Fig. 3 is the representation of the transmission using a fluid coupling having a slip of 2.62% at 3200 r.p.m., and Fig. 4 represents the characteristics of the transmission using a fluid coupling having a 1% slip at 3200 r.p.m. The methods of changing the slip in a fluid coupling are well known and include changing the amount of fluid in the coupling, changing the weight of the oil in the coupling, et cetera.

In the transmission the function of the fluid coupling is to place a retarding force on the ring gear or secondary driver of the primary planet set. The secondary sun gear must rotate at a higher rate than the primary sun, for as the ratio between the two gears approaches unity, the ratio of the torque delivered by the source to the torque which is delivered through the fluid coupling back to the source approaches unity. Therefore no retarding force is exerted on the ring gear and no speed reduction or torque multiplication is possible. It is preferable to use fluid couplings having the larger values of slip so as to produce a greater multiplication through the transmission.

The retarding force on the ring gear is preferably produced by a fluid coupling since it is a readily available device and it has versatility which provides versatility of the transmission. Other retarding means may be utilized to produce the torque multiplication through the transmission and following the teachings of this invention. Obviously, various clutches, brakes, et cetera may be incorporated in the transmission for specific purposes or for achieving special results without departing from the scope and intent of concept of the invention. Such additions to the device expand into fields of use and utility.

While the invention has been illustrated by reference to a particular device, there is no intent to limit the scope of the invention to the precise details so set forth, except as defined in the following claims.

I claim:

1. An automatic transmission for stepless speed change and torque multiplication comprising a pair of planetary sets mounted in a common freely rotatable ring gear, each planetary gear set including a sun gear and at least one planet gear, the shafts of the planet gears of each set being arranged for conjoint rotation, an input shaft rotatively interconnected with the sun gear of a first of said gear sets, the sun gear of said second set being arranged for a higher speed of rotation than the sun gear of said first planetary set, an output shaft mounted for conjoint rotation with the shafts of said planet gears, and means for providing a variable retarding force on said second sun gear.

2. An automatic transmission according to claim 1 in which the retarding means is a fluid coupling having a runner interconnected with the first sun gear and an impeller interconnected with the second sun gear.

3. An automatic transmission for stepless speed change and torque multiplication comprising a pair of planetary sets mounted in a common freely rotatable ring gear, each planetary gear set including a sun gear and at least one planetary gear, the shafts of said planet gears being arranged for conjoint rotation, an input shaft rotatively interconnected with the sun gear of a first of said planetary gear sets, the sun gear of the second planetary gear set being arranged for a higher speed of rotation than the first sun gear, an output shaft mounted for conjoint rotation with the shafts of said planet gears, means interconnected with the shafts of planet gears arranged to prevent reverse rotation thereof, and means for providing a variable retarding force on said second sun gear.

4. An automatic transmission according to claim 3 in which the means interconnected with the planet gear shafts is a one way clutch arranged to prevent reverse rotation thereof.

5. An automatic transmission for stepless speed change and torque multiplication comprising a pair of planetary sets mounted in a common freely rotatable ring gear, each planetary set including a sun gear and at least one planet gear in train with said common ring gear, the shafts of said planet gears being arranged for conjoint rotation, an input shaft rotatively interconnected with the sun gear of a first of said planetary gear sets, the sun gear of the second planetary set being arranged for a higher speed of rotation than said first sun gear, an output shaft mounted for conjoint rotation with the shafts of the said planet gears, releasable means for directly connecting said input and output shafts, and means for providing a variable retarding force on said second sun gear.

6. An automatic transmission for stepless speed change and torque multiplication output comprising a power input shaft, a primary and a secondary planetary gear set, each planetary gear set including a sun gear and at least one planet gear, the sun gear of said primary set being rotatively interconnected with said input shaft, the shafts of said planet gears of said primary set being arranged for conjoint rotation with the shaft of said planet gears of said second secondary set, said secondary sun being arranged to rotate at a higher speed and said primary sun, a ring gear mounted for rotation on said primary set and a ring gear mounted for rotation on said secondary set, the ring gear of said primary set and the ring gear of said secondary set being interconnected for conjoint and free rotation around said primary and secondary sets, a transmission output shaft rotatively interconnected with the shafts of said planet gears, and a fluid coupling interconnected between said secondary sun gear and said input shaft and providing a variable retarding force on said secondary sun gear.

7. An automatic transmission for stepless speed change and torque multiplication output comprising an input shaft, a primary and a secondary planetary gear set, each planetary gear set including a sun gear and at least one planet gear, the sun gear of said primary set being rotatively interconnected with said input shaft, the sun gear of said second set being mounted for independent rotation on said input shaft, the shafts of said planet gears of said primary set being arranged for conjoint rotation with the shafts of said planetary gears of said secondary set, said secondary sun being arranged to rotate at a higher speed than said primary sun, a ring gear mounted for rotation on said primary set and a ring gear mounted for rotation on said secondary set, the ring gear on said primary set being arranged for conjoint rotation with a ring gear on said secondary set and both mounted for conjoint free rotation on said primary and secondary sets, a transmission output shaft rotatively interconnected with the shafts of said planet gears, and a fluid coupling interconnected between said secondary sun gear and said input shaft and providing a variable retarding force on said secondary sun gear.

8. An automatic transmission for stepless speed change and torque multiplication output comprising an input shaft, a primary and a secondary planetary gear set, each planetary gear set including a sun gear and at least one planet gear, the sun gear of said primary set being rotatively interconnected with said input shaft, the shafts of the planet gears being mounted in a common carrier so as to provide conjoint rotation of such shafts, said planet gear shafts being angularly spaced about said sun gears, said secondary sun being arranged to rotate at a higher rate of speed than said primary sun gear, a ring gear mounted for rotation on said primary gear set and a ring gear mounted for rotation on said secondary gear set, the ring gear on said primary set being interconnected with the ring gear of said secondary gear set so as to form a common freely rotatable ring gear for said planetary set and arranged as a speed escapement between said planetary sets, a transmission output shaft rotatively interconnected with the shafts of said planet gears, and a fluid coupling interconnected between said secondary sun gear and said input shaft and providing a variable retarding force on said secondary sun gear.

References Cited in the file of this patent

UNITED STATES PATENTS

| | | |
|---|---|---|
| 2,627,763 | Wolf | Feb. 10, 1953 |
| 2,641,142 | Klepetko | June 9, 1953 |
| 2,722,851 | Steiner | Nov. 8, 1955 |

FOREIGN PATENTS

| | | |
|---|---|---|
| 511,561 | France | Sept. 27, 1920 |